United States Patent
Peng et al.

(10) Patent No.: US 12,321,466 B2
(45) Date of Patent: Jun. 3, 2025

(54) DATABASE HIERARCHICAL ENCRYPTION FOR HYBRID-CLOUD ENVIRONMENT

(71) Applicant: International Business Machines Corporation, Armonk, NY (US)

(72) Inventors: Zhe Hua Peng, Beijing (CN); Peng Hui Jiang, Beijing (CN); Ting Yin, Beijing (CN); Jun Su, Beijing (CN); Feng Zhang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 481 days.

(21) Appl. No.: 17/647,695

(22) Filed: Jan. 11, 2022

(65) Prior Publication Data

US 2023/0222228 A1 Jul. 13, 2023

(51) Int. Cl.
*G06F 21/60* (2013.01)
*G06F 21/62* (2013.01)
*G06N 20/00* (2019.01)

(52) U.S. Cl.
CPC ........ *G06F 21/602* (2013.01); *G06F 21/6218* (2013.01); *G06N 20/00* (2019.01)

(58) Field of Classification Search
None
See application file for complete search history.

(56) References Cited

U.S. PATENT DOCUMENTS 7,669,051 B2   2/2010  Redlich et al.
8,086,857 B2  12/2011  Appenzeller et al.
10,699,023 B1 * 6/2020  Mokashi ............. H04L 63/0485
11,144,669 B1 * 10/2021 Rao ........................ G06N 7/01
11,838,410 B1 * 12/2023 Ramanathan ......... H04L 9/0825

(Continued)

FOREIGN PATENT DOCUMENTS

CN   102236766 B      4/2014
CN   107003815 A      8/2017
CN   108595971 A  *   9/2018

OTHER PUBLICATIONS

D. Sangeetha et al., "Enhanced Security of PHR System in Cloud Using Prioritized Level Based Encryption," SNDS 2014: Recent Trends in Computer Networks and Distributed Systems Security, Year: 2014, pp. 57-69.

(Continued)

*Primary Examiner* — Bassam A Noaman
(74) *Attorney, Agent, or Firm* — Patterson + Sheridan, LLP

(57) ABSTRACT

Techniques for hierarchical encryption for data storage are disclosed, in one or more embodiments. These techniques include parsing an electronic database storage request, based on the syntax of the request, to identify a plurality of request elements and determining, using one or more trained machine learning (ML) models, one or more sensitivities associated with the plurality of request elements. The techniques further include identifying one or more encryption techniques for the plurality of request elements based on the one or more sensitivities, encrypting data associated with the database storage request using the identified one or more encryption techniques, and storing the encrypted data and one or more associated encryption keys in an electronic database, using the electronic database storage request.

20 Claims, 14 Drawing Sheets

(56) References Cited

U.S. PATENT DOCUMENTS

| | | | |
|---|---|---|---|
| 2008/0033960 A1* | 2/2008 | Banks | H04L 9/0894 |
| | | | 707/999.009 |
| 2020/0145188 A1* | 5/2020 | Ghosh | H04W 12/033 |
| 2023/0005391 A1* | 1/2023 | Sharma | G06F 21/602 |

OTHER PUBLICATIONS

Sudha Devi Dorairaj, Thilagavathy Kaliannan, "An Adaptive Multilevel Security Framework for the Data Stored in Cloud Environment," The Scientific World Journal 2015, dated Jul. 16, 2015, pp. 1-12.

Munwar Ali Zardari et al., "K-NN Classifier for Data Confidentiality in Cloud Computing," 2014 International Conference on Computer and Information Sciences (ICCOINS), dated Jul. 31, 2014, pp. 1-6.

* cited by examiner

| Row ID | Column name | Data Type | Access Frequency | Owner | Data Length | Communication Method | Data source | Database operation |
|---|---|---|---|---|---|---|---|---|
| 3 | User ID | Short int | 3M | DBADMIN | NA | HTTPS | JDBC | INSERT |
| 3 | Level | Short int | 200K | DBADMIN | NA | HTTPS | JDBC | INSERT |
| 3 | Salary | Float | 200K | DBADMIN | NA | HTTPS | JDBC | INSERT |
| 3 | Phone No. | Char | 200K | DBADMIN | 15 | HTTPS | JDBC | INSERT |
| 3 | Birth Date | Date | 200K | DBADMIN | NA | HTTPS | JDBC | INSERT |
| 3 | Hire Date | Date | 200K | DBADMIN | NA | HTTPS | JDBC | INSERT |

FIG. 5B

| Table Name | Column | Row ID | Security Level | Key ID |
|---|---|---|---|---|
| User | Password | 1 | 1 | |
| Emp | Salary | 3 | 1 | |
| Emp | BandIv | 3 | 5 | |
| Emp | Phone No. | 3 | 5 | |
| Emp | Birth Date | 3 | 2 | |
| Emp | Hire Date | 3 | 6 | |

DATABASE HIERARCHICAL ENCRYPTION FOR HYBRID-CLOUD ENVIRONMENT

BACKGROUND

The present invention relates to data security, and more specifically, to hierarchical encryption for data storage. Data security is a challenging, and important, problem. Data encryption for data storage is typically chosen by a customer (e.g., during a design stage), and often uses a single, or static, encryption technique for each data set. But in an actual data set, different data commonly has different levels of data sensitivity. Applying a single, or static, encryption technique for each data set can result in excessive encryption for some data, resulting in wasted computing resources and poor system performance, or insufficient encryption for other data, leading to security risks.

For example, "Enhanced Security of PHR System in Cloud Using Prioritized Level Based Encryption," by D. Sangeetha et al. (hereinafter "Sangeetha"), discloses a system for encrypting "Personal Health Records (PHR)" in which "separate encryption techniques have to be enforced for text and image data." Sangeetha at Abstract. According to Sangeetha, "[d]ata classification is done prior to storage" into one of three "protection rings": "Protection Ring 3 corresponds to PHR files with low criticality level. Protection Ring 2 corresponds to PHR files with moderate criticality level. Protection Ring 1 corresponds to PHR files with extreme criticality level." Sangeetha at 62-63. A Prioritized Level Based Encryption Technique (PLBE) is applied to all data in each level. Id. at 58, 63. This pre-defined level based encryption can result in excessive encryption for some data, resulting in wasted computing resources and poor system performance, or insufficient encryption for other data, leading to security risks.

SUMMARY

Embodiments include a method. The method includes parsing an electronic database storage request, based on the syntax of the request, to identify a plurality of request elements. The method further includes determining, using one or more trained machine learning (ML) models, one or more sensitivities associated with the plurality of request elements. The method further includes identifying one or more encryption techniques for the plurality of request elements based on the one or more sensitivities. The method further includes encrypting data associated with the database storage request using the identified one or more encryption techniques. The method further includes storing the encrypted data and one or more associated encryption keys in an electronic database, using the electronic database storage request.

Embodiments further include a system, including a memory, and a processor communicatively coupled to the memory, the processor configured to perform operations. The operations include parsing an electronic database storage request, based on the syntax of the request, to identify a plurality of request elements. The operations further include determining, using one or more trained machine learning (ML) models, one or more sensitivities associated with the plurality of request elements. The operations further include identifying one or more encryption techniques for the plurality of request elements based on the one or more sensitivities. The operations further include encrypting data associated with the database storage request using the identified one or more encryption techniques. Operations further include storing the encrypted data and one or more associated encryption keys in an electronic database, using the electronic database storage request.

Embodiments further include a computer program product, including a computer-readable storage medium having computer-readable program code embodied therewith, the computer-readable program code executable by one or more computer processors to perform operations. The operations include parsing an electronic database storage request, based on the syntax of the request, to identify a plurality of request elements. The operations further include determining, using one or more trained machine learning (ML) models, one or more sensitivities associated with the plurality of request elements. The operations further include identifying one or more encryption techniques for the plurality of request elements based on the one or more sensitivities. The operations further include encrypting data associated with the database storage request using the identified one or more encryption techniques. Operations further include storing the encrypted data and one or more associated encryption keys in an electronic database, using the electronic database storage request.

Aspects of the embodiments described above have numerous technical advantages. For example, existing encryption techniques may use single, or static, encryption techniques for data storage, which can result in excessive encryption, leading to wasted compute resources and poor system performance, or insufficient encryption, leading to security risks. Aspects of the embodiments described above can be used for hierarchical encryption for data storage, in which data storage (e.g., database storage) encryption and decryption can be optimized for performance, efficiency, and security.

Optionally, identifying the one or more encryption techniques in one or more of the embodiments described above includes identifying a plurality of different encryption techniques based on identifying a plurality of different sensitivities corresponding to the plurality of request elements using the one or more trained ML models. This has the further advantage of classifying request elements with different sensitivities and applying different encryption techniques.

Optionally, the method or operations described above include selecting an ML model, from among a plurality of different ML models, for each request element based on a characteristic of the request element, and determining a sensitivity corresponding to each request element based on analyzing the request element using the respective selected ML model. This has the further advantage of using a suitable ML model to determine the sensitivity of each request element.

Optionally, the method or operations described above include identifying a plurality of different encryption techniques for the data storage request based on the determined sensitivity corresponding to each request element, wherein encrypting the data uses the identified plurality of different encryption techniques. This has the advantage of applying a plurality of different encryption techniques to the request based on the determined sensitivities.

Optionally, identifying the one or more encryption techniques in or one or more of the embodiments described above includes determining a pairing of a data element in the electronic database storage request and an encryption technique based on providing one or more of the plurality of request elements to the one or more trained ML models.

Optionally, the electronic database storage request in or one or more of the embodiments described above includes a data manipulation language (DML) statement, and parsing the electronic database storage request includes: constructing a syntax tree from the electronic database storage request, and identifying the plurality of request elements using the syntax tree.

Optionally, identifying the one or more encryption techniques in or one or more of the embodiments described above includes determining the one or more encryption techniques based on analyzing the determined one or more sensitivities using a second one or more ML models.

Optionally, identifying the one or more encryption techniques in or one or more of the embodiments described above includes determining the one or more encryption techniques based on looking up the determined one or more sensitivities in a lookup table.

Optionally, the method or operations described above include parsing an electronic database query to identify a plurality of query elements, determining one or more decryption techniques associated with the plurality of query elements, retrieving data from an electronic database using the electronic database query, and decrypting the data using the determined one or more decryption techniques. Further, optionally, determining the one or more decryption techniques associated with the plurality of query elements includes retrieving the one or more decryption techniques from an electronic catalog.

BRIEF DESCRIPTION OF THE SEVERAL VIEWS OF THE DRAWINGS

FIG. 5B illustrates request elements for hierarchical encryption for data storage, according to one embodiment.

FIG. 6C illustrates a security matrix for hierarchical encryption for data storage, according to one embodiment

DETAILED DESCRIPTION

As discussed above, existing encryption techniques that use single, or static, encryption techniques for data storage have significant drawbacks. They can result in excessive encryption, leading to wasted compute resources and poor system performance, or insufficient encryption, leading to security risks. This is particularly true in a cloud storage environment (e.g., a public cloud, a private cloud, a hybrid cloud, or any other suitable cloud storage environment). In a cloud environment, the amount of data to be stored is often very large, and unstructured data can be mixed with varying levels of sensitive information. This makes secure data storage very challenging.

One or more techniques disclosed herein can be used for hierarchical encryption for data storage, in which data storage (e.g., database storage) encryption and decryption can be optimized for performance, efficiency, and security. For example a data storage request can be parsed, and each element can be classified based on its likely sensitivity. In an embodiment, one or more ML models can be used to classify each element. Further, each element can be paired with a suitable encryption technique. For example, one or more ML models can be used to identify a suitable encryption technique for each element, based on the element's sensitivity. The identified encryption techniques can be used to encrypt data for secure storage, and to decrypt previously stored data.

Figure 1:
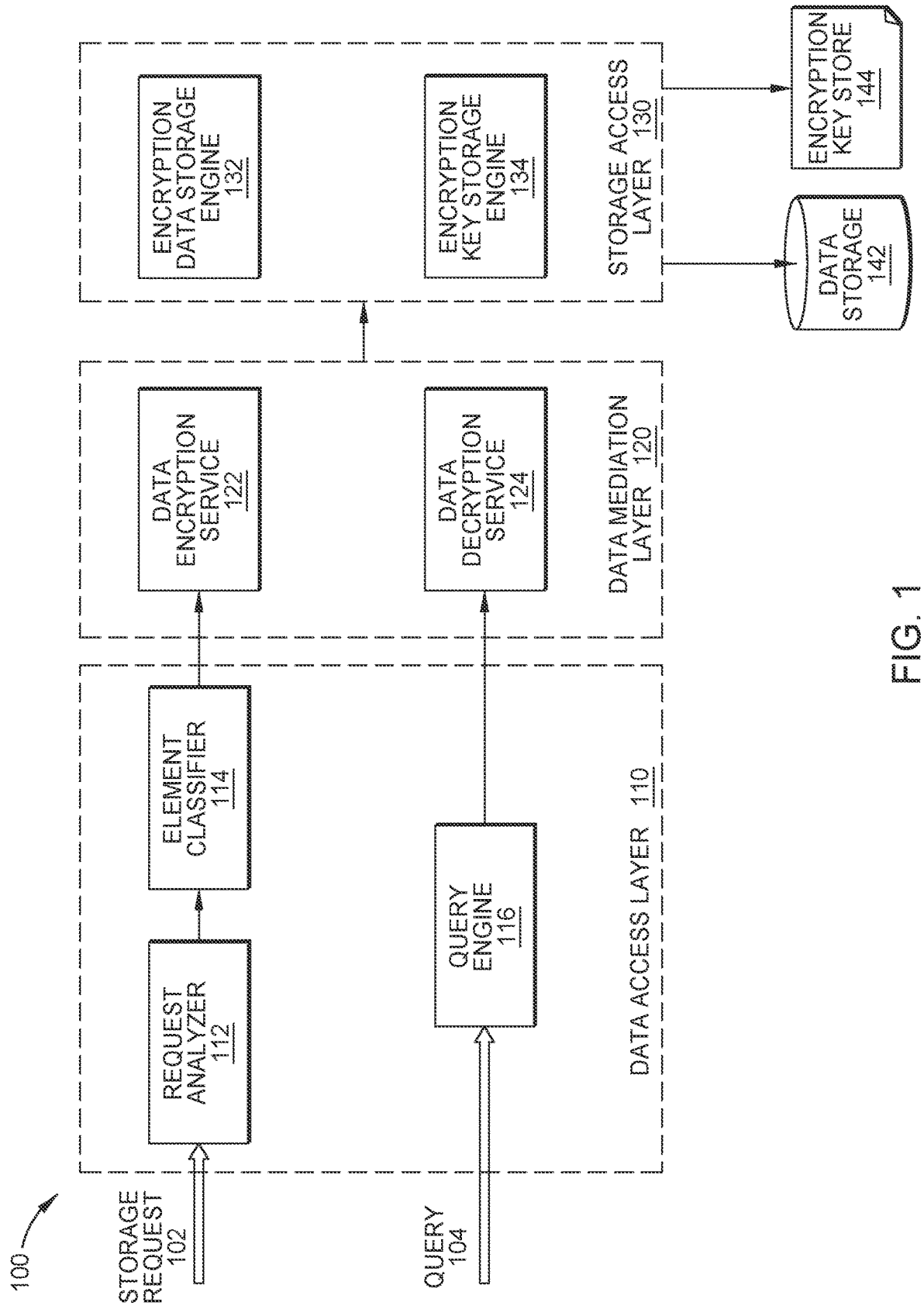
FIG. 1 illustrates a computing environment for hierarchical encryption for data storage, according to one embodiment.

FIG. 1 illustrates a computing environment 100 for hierarchical encryption for data storage, according to one embodiment. In an embodiment, the computing environment 100 facilitates both secure storage of data (e.g., storage of secure encrypted data) and secure retrieval of data (e.g., secure decryption of stored encrypted data). Starting with secure storage of data, a storage request 102 is provided to a request analyzer 112 in a data access layer 110. For example, the storage request 102 can be a database storage request to store data in a suitable database (e.g., a structured query language (SQL) request to store data in a relational database).

In an embodiment, the request analyzer 112 receives the storage request 102 and parses the request into elements. For example, the request analyzer 112 can analyze and abstract data manipulation language (DML) (e.g., SQL) statements into multiple elements. This is discussed further with regard to FIGS. 3 and 4A-B, below.

In an embodiment, the request analyzer 112 then provides the parsed storage request 102 (e.g., the parsed elements from the DML statement) to an element classifier 114. The element classifier 114 can analyze the parsed storage request 102, and identify a suitable level of encryption for the storage request 102. This can be done for the storage request 102 as a whole (e.g., based on the parsed elements), or for different parsed elements of the storage request 102 (e.g., various elements of the DML statement). This is discussed further below with regard to FIG. 3 and FIGS. 5A-B. Further, in an embodiment, the element classifier 114 can identify a suitable ML model, or models, for each parsed element of the storage request 102, and the ML model can infer the suitable level of encryption for the statement. This is discussed further below with regard to FIGS. 6A-C.

The element classifier 114 then uses a data encryption service 122, in a data mediation layer 120, to encrypt the data for storage. For example, the element classifier 114 can identify one or more encryption techniques to use for encrypting the data identified in the storage request 102 (e.g., using suitable ML models). The data encryption service 122 can use the identified encryption techniques to encrypt the data. This is discussed further below with regard to FIG. 7.

In an embodiment, the data encryption service 122 then uses an encryption data storage engine 132 and an encryption key storage engine 134, in a storage access layer 130, to store the encrypted data. For example, the encryption data storage engine 132 can store the encrypted data in a data store 142. The data store 142 can be any suitable data repository, including any suitable electronic database (e.g., a relational database, a graph database, or any other suitable electronic database), a cloud storage location (e.g., a public cloud, private cloud, hybrid cloud, or any other suitable cloud storage location), an on premises cluster, or any other suitable data repository. The encryption key storage engine 134 can store an encryption key (e.g., used to encrypt the data) in an encryption key store 144. In an embodiment, the encryption key store 144 can be a portion of the data store 142 (e.g., a table in an electronic database). Alternatively, or in addition, the encryption key store 144 can be separate from the data store 142.

Returning to the data access layer 110, the environment 100 can also facilitate secure retrieval of data (e.g., decryption of encrypted data). A query 104 (e.g., a DML query) can be provided to a query engine 116. In an embodiment, the query engine 116 can identify the encryption associated with the stored data referenced in the query, and can use the data decryption service 124 to decrypt the data. For example, the query engine 116 can provide query services for a user. The query engine 116 can parse a query string and optimize the query path (e.g., rewrite query string). After a query result is fetched, the query engine 116 can call the data decryption service 124 to decrypt data. The data decryption service 124 can identify the encrypted data in the data store 142 using the encryption data storage engine 132, can identify the encryption key, or keys, associated with the data in the encryption key store 144 using the encryption key storage engine 134, and can decrypt the data. This is discussed further below with regard to FIG. 8.

Figure 2:
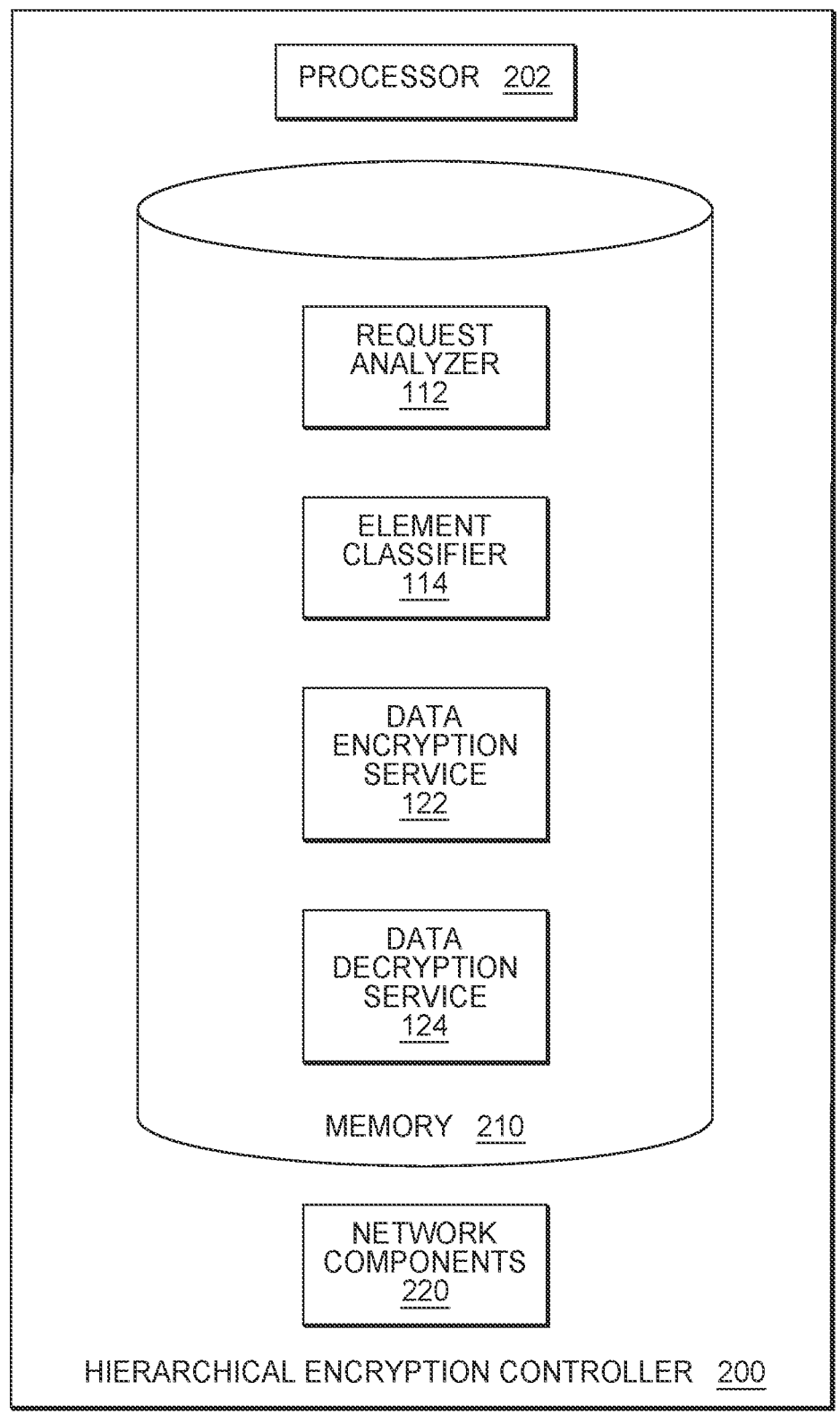
FIG. 2 illustrates a hierarchical encryption controller, according to one embodiment.

FIG. 2 illustrates a hierarchical encryption controller 200, according to one embodiment. The hierarchical encryption controller 200 includes a processor 202, a memory 210, and network components 220. The processor 202 generally retrieves and executes programming instructions stored in the memory 210. The processor 202 is representative of a single central processing unit (CPU), multiple CPUs, a single CPU having multiple processing cores, graphics processing units (GPUs) having multiple execution paths, and the like.

The network components 220 include the components necessary for the hierarchical encryption controller 200 to interface with a suitable communication network (e.g., a communication network interconnecting various components of the environment 100 illustrated in FIG. 1, or interconnecting the environment 100 with other computing systems). For example, the network components 220 can include wired, WiFi, or cellular network interface components and associated software. Although the memory 210 is shown as a single entity, the memory 210 may include one or more memory devices having blocks of memory associated with physical addresses, such as random access memory (RAM), read only memory (ROM), flash memory, or other types of volatile and/or non-volatile memory.

The memory 210 generally includes program code for performing various functions related to use of the hierarchical encryption controller 200. The program code is generally described as various functional "applications" or "modules" within the memory 210, although alternate implementations may have different functions and/or combinations of functions. Within the memory 210, the request analyzer 112 facilitates parsing a data storage request, the element classifier 114 facilitates classifying the sensitivity of various elements in a data storage request and identifying suitable encryption techniques, the data encryption service 122 facilitates encrypting data identified by a data storage request (e.g., using encryption techniques identified using the element classifier 114), and the data decryption service 124 facilitates decrypting stored encrypted data (e.g., identified by a query). This is discussed further below with regard to FIGS. 3-8B.

While the hierarchical encryption controller 200 is illustrated as a single entity, in an embodiment, the various components can be implemented using any suitable combination of physical services, cloud compute nodes and storage locations, or any other suitable implementation. For example, the hierarchical encryption controller 200 could be implemented using a server or cluster of servers (e.g., maintained by the data owner). As another example, the hierarchical encryption controller 200 can be implemented using a combination of compute nodes and storage locations in a suitable cloud environment. For example, one or more of the components of the hierarchical encryption controller 200 can be implemented using a public cloud, a private cloud, a hybrid cloud, on premises cluster, or any other suitable implementation.

Figure 3:
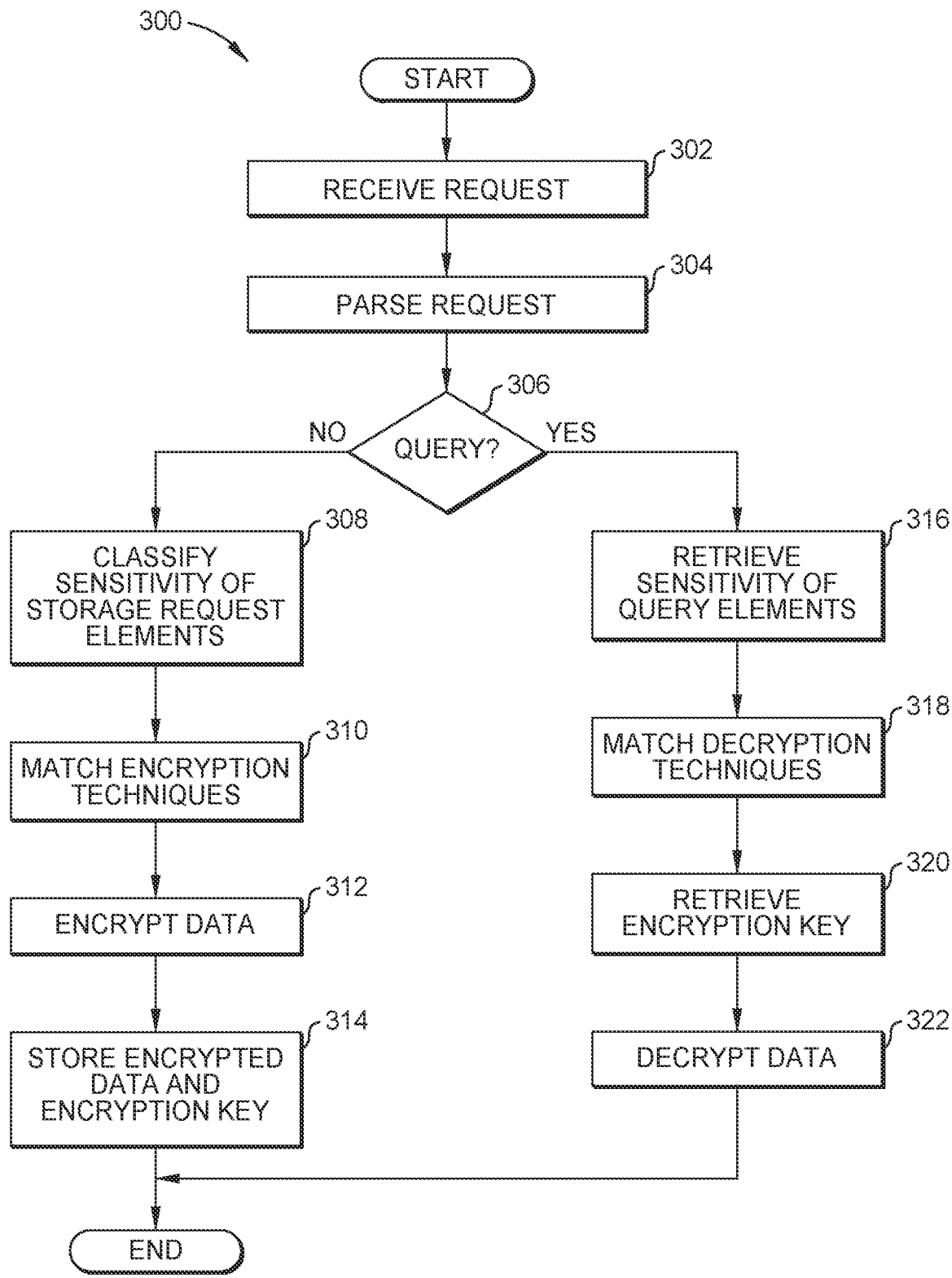
FIG. 3 is a flowchart illustrating hierarchical encryption for data storage, according to one embodiment.

FIG. 3 is a flowchart 300 illustrating hierarchical encryption for data storage, according to one embodiment. At block 302 a request analyzer (e.g., the request analyzer 112 illustrated in FIGS. 1-2) receives a request. In an embodiment, the request is storage request (e.g., the storage request 102 illustrated in FIG. 1) to store data in a suitable secure storage location (e.g. to store data in an encrypted format in a suitable electronic database). Alternatively, the request is a query (e.g., the query 104 illustrated in FIG. 1) to retrieve data from a suitable secure storage location (e.g., to decrypt data stored in an encrypted format in a suitable electronic database).

At block 304, the request analyzer parses the request. In an embodiment, the request can be a suitable DML request (e.g., a SQL request), and the request analyzer parses the request based on the syntax of the request. For example, the request analyzer can construct a syntax tree from the DML request, and use the syntax tree to parse the request into various elements. This is discussed further, below, with regard to FIGS. 4A-B.

At block 306, the element classifier determines whether the request is a query (e.g., as opposed to a storage request). This is merely one example, and any suitable software or hardware component can determine whether the request is a query (e.g., the request analyzer or any other suitable software or hardware component). If the request is not a query (e.g., it is a data storage request), the flow proceeds to block 308. If the request is a query, the flow proceeds to block 316.

At block 308, an element classifier (e.g., the element classifier 114 illustrated in FIGS. 1-2) classifies the sensitivity of the request elements (e.g., the storage request elements). For example, the element classifier can receive a parsed DML request, generated by the request analyzer at block 304. The element classifier can use the parsed elements to classify the sensitivity of the request as a whole, or of the various request elements. For example, the element classifier can select a suitable ML model for each request element, and can use the ML model(s) to classify the sensitivity of the request. This is discussed further, below, with regard to FIGS. 5A-B.

At block 310, a data encryption service (e.g., the data encryption service 122 illustrated in FIGS. 1-2) matches an encryption technique to the request elements. For example, as discussed below in relation to FIGS. 5A-B, in an embodiment, the element classifier associates a security level with each element in the request (e.g., a numeric security level). The data encryption service can use this security level to determine a suitable encryption technique for each request element. This is discussed further below with regard to FIG. 7.

In an embodiment, the data encryption service can select among a variety of encryption techniques, with tradeoffs in security compared to computational burden and speed. For example, stronger encryption techniques tend to be more secure, but require greater computational resources and take longer for encryption and decryption. Weaker encryption techniques may be somewhat less secure, but require fewer computation resources and take less time for encryption and decryption. In an embodiment, the data encryption service selects a stronger encryption technique for request elements with a higher security level, and selects a weaker encryption technique for request elements with a lower security level.

At block 312, the data encryption service encrypts the data. In an embodiment, the data encryption service uses the selected encryption technique (e.g., selected at block 312) to encrypt data associated with the received request (e.g. the request received at block 302). This generates encrypted cipher text in place of the data, which can be securely stored.

At block 314, the data encryption service stores the encrypted data and the encryption key (or keys). For example, the data encryption service can store the cipher text generated at block 312 in a suitable data store (e.g., the data store 142 illustrated in FIG. 1). The data store can be a relational database, a graph database, another form of electronic database, or any other suitable storage repository. The data encryption service further stores the associated encryption key, or keys (e.g., if multiple encryption techniques are used). For example, the data encryption service can store the key(s) in a suitable encryption key store (e.g., the encryption key store 144 illustrated in FIG. 1).

Returning to block 306, if the request is a query the flow proceeds to block 316. At block 316 a data decryption service (e.g., the data decryption service 124 illustrated in FIGS. 1-2) retrieves the sensitivity of the query elements. For example, as discussed above in relation to block 308, a data storage request can be classified based on the sensitivity of the request elements. In an embodiment, the sensitivity of the storage request is classified, as a whole, based on the elements. Alternatively, or in addition, the respective sensitivities of various elements of the storage request are classified, separately. In an embodiment, these classified sensitivities are stored (e.g., in a suitable data store) and are retrieved by the data decryption service. This is merely an example, and in an embodiment the decryption techniques associated with each query element can be stored directly (e.g., in a catalog, as discussed below in relation to FIG. 8). In this embodiment the data decryption service skips block 316 and instead proceeds to block 318.

At block 318 the data decryption service matches the classified query elements to decryption technique(s). As discussed above in relation to block 310, and below in relation to FIG. 7, when storing secure data the encryption service matches the request elements to one or more suitable encryption techniques. In an embodiment, the data decryption service identifies the encryption technique, or techniques, associated with the data requested by the query (e.g., using the sensitivity retrieved at block 316, or directly from a catalog). This is discussed further below with regard to FIG. 8.

At block 320, the data decryption service retrieves the encryption key, or keys, associated with the query. For example, the data decryption service can retrieve the encryption key from a suitable encryption key store (e.g., the encryption key store 144 illustrated in FIG. 1). This is also discussed further below with regard to FIG. 8.

At block 322, the data decryption service decrypts the data. For example, the data decryption service uses the encryption key, or keys, retrieved at block 318 to generate the original data from the stored cipher text.

Figure 4A:
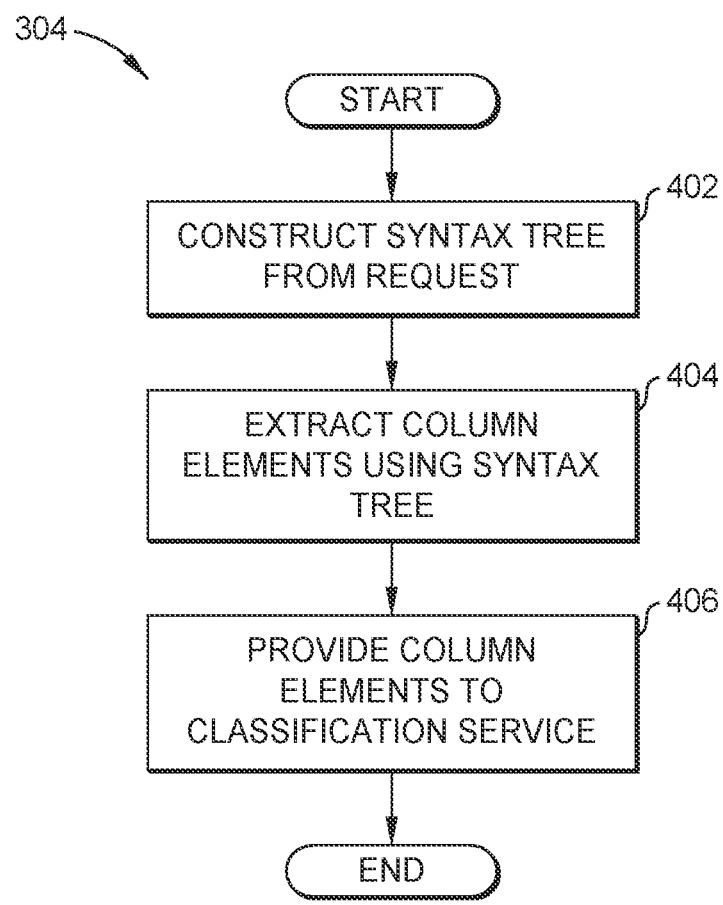
FIG. 4A is a flowchart illustrating parsing a request for hierarchical encryption for data storage, according to one embodiment.

FIG. 4A is a flowchart illustrating parsing a request for hierarchical encryption for data storage, according to one embodiment. In an embodiment, FIG. 4A corresponds with block 304 illustrated in FIG. 3. At block 402, a request analyzer (e.g., the request analyzer 112 illustrated in FIGS. 1-2) constructs a syntax tree from a request (e.g., a DML request received at block 302 illustrated in FIG. 3) to parse the request based on its syntax.

Figure 4B:
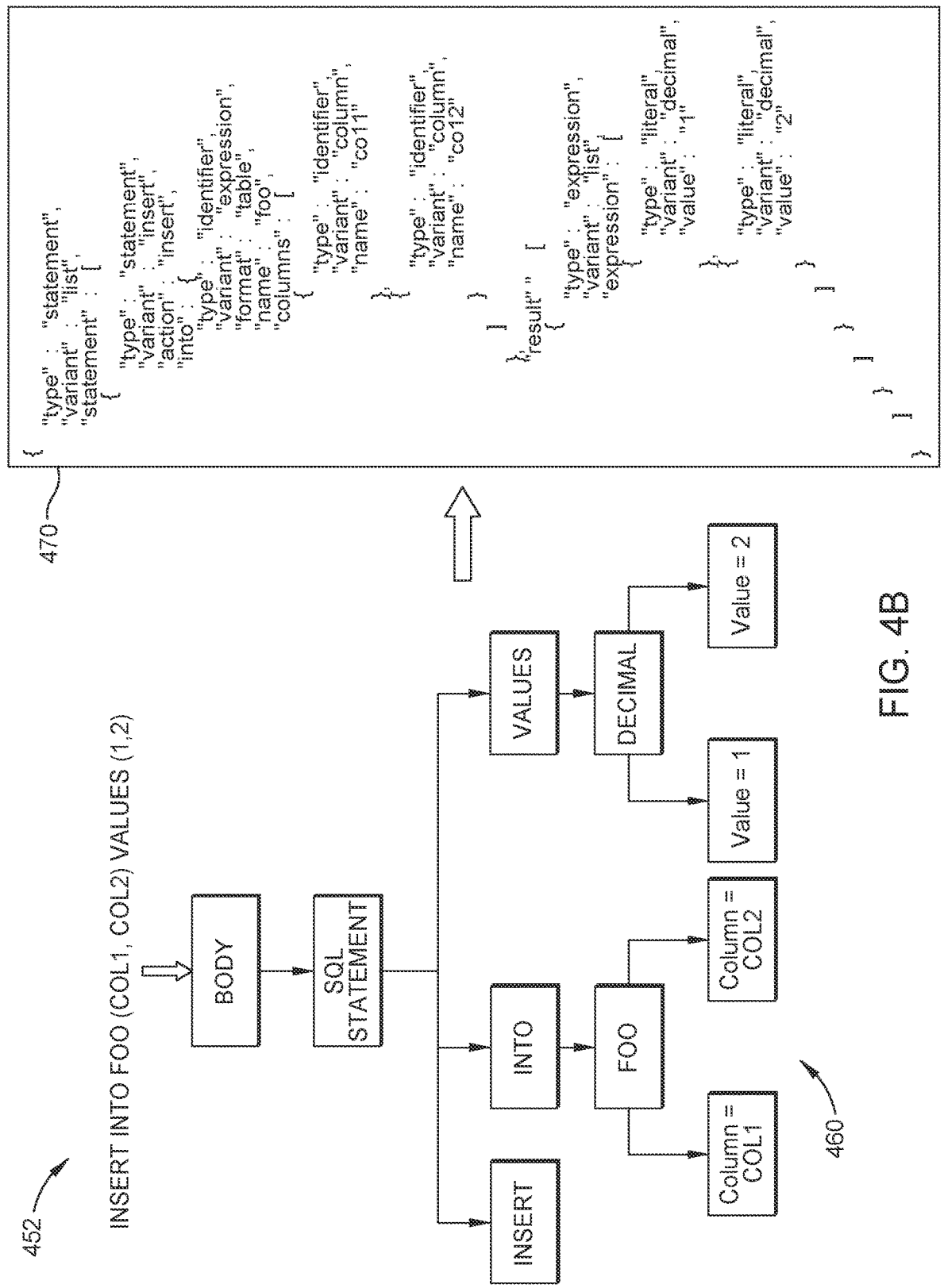
FIG. 4B illustrates constructing a syntax tree for parsing a request, according to one embodiment.

For example, FIG. 4B illustrates constructing a syntax tree for parsing a request (e.g., a SQL request), according to one embodiment. In an embodiment, a request 452 seeks to insert the values (1, 2) into the table FOO at the location (COL1, COL2). In an embodiment, this request adds a new row to the table FOO with the value 1 at COL1 and the value 2 at COL2.

This request 452 can be parsed to generate a syntax tree, with a graphical representation 460 and a textual representation 470. As illustrated, the body of the request includes a SQL statement, which includes three elements: an INSERT element, an INTO element, and a Values element. The INSERT element is an action. The INTO element identifies the destination location, here the table FOO at COL1 and COL2. The Values element identifies the values to insert, here decimal values 1 and 2. In an embodiment, this is illustrated with a graphical representation 460 of the syntax tree, and a textual representation 470.

Returning to FIG. 4A, at block 404 the request analyzer extracts column elements using the syntax tree. For example, using the example illustrated in FIG. 4B, the request analyzer can extract the column elements COL1 and COL2, for the table FOO, from the request 452. At block 406, the request analyzer provides the column elements to a classification service for classification (e.g., to determine a level of sensitivity for the column elements). This is discussed further below with regard to FIGS. 5A-C.

Figure 5A:
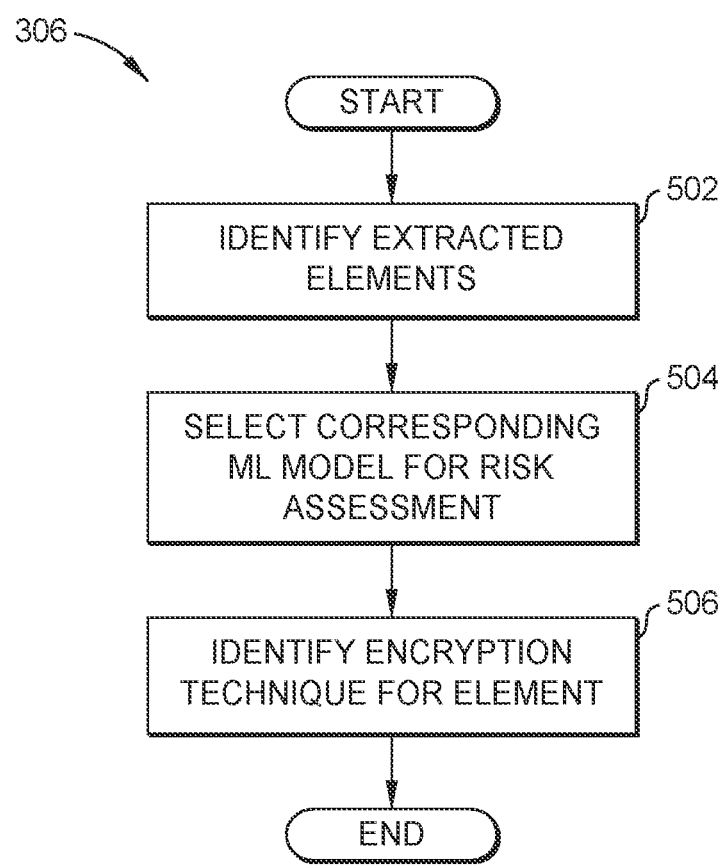
FIG. 5A is a flowchart illustrating classifying request elements for hierarchical encryption for data storage, according to one embodiment.

FIG. 5A is a flowchart illustrating classifying request elements for hierarchical encryption for data storage, according to one embodiment. In an embodiment, FIG. 5A corresponds with block 306 illustrated in FIG. 3. At block 502 an element classifier (e.g., the element classifier 114 illustrated in FIGS. 1-2) identifies extracted elements. For example, the element classifier can receive a request (e.g., a storage request 102 or query 104 illustrated in FIG. 1) that has been parsed by a request analyzer (e.g., as discussed above in relation to FIGS. 4A-B). The element classifier can identify extracted elements in the parsed request (e.g., extracted using the syntax tree illustrated in FIG. 4B). These can include various elements of a DML request (e.g., a SQL request), including operations, column and row identifiers, values, and any other suitable elements.

At block 504, the element classifier selects a corresponding ML model for risk assessment. For example, as discussed below in relation to FIGS. 6A-C, multiple ML models can be trained to identify a sensitivity level for a given request element (e.g., a given parsed element in a DML statement). In an embodiment, the ML models can be trained to identify the sensitivity level for each element in a request, or for any subset of elements in the request. Alternatively, or in addition, the ML models can be trained to identify the sensitivity level for the request as a whole.

In an embodiment, the element classifier can select a suitable ML model for the various elements. For example, the element classifier can select a suitable ML model based on a characteristic of the element, or any other suitable factor. The element classifier can use any suitable characteristic, including the type of element (e.g., operation, column identifier, row identifier, value), the content of the element (e.g., a column name), the data type of the element (e.g., floating point, BLOB, etc.), the access frequency for the element, the owner for the element (e.g., the user level), the data length for the element, a communication method for the element (e.g., encrypted or unencrypted communication), a data source for the element (e.g., private cloud, public cloud, etc.), or the type of operation (e.g., GRANT, REVOKE, UPDATE, INSERT, etc.). These are merely examples, and the element classifier can use any suitable technique.

At block 506, the element classifier can identify an encryption technique for the element. In an embodiment, the ML model identified at block 504 can be used to also identify the corresponding encryption technique. For example, as discussed below in relation to FIGS. 6A-C, the ML model can be trained to identify both the sensitivity for elements, and corresponding encryption techniques. Alternatively, or in addition, the ML model identified at block 504 can identify a sensitivity level for an element (or elements), and the element classifier can use that identified sensitivity level to identify a corresponding encryption technique. For example, the element classifier can use an additional ML model to infer the encryption technique from the identified sensitivity. Alternatively, or in addition, the element classifier can use a lookup table, or any other suitable technique.

FIG. 5B illustrates request elements 540 for hierarchical encryption for data storage, according to one embodiment. As discussed above, an element classifier (e.g., the element classifier 114 illustrated in FIGS. 1-2) uses numerous factors to classify request elements. In an embodiment, the element classifier can identify the sensitivity of each request element. Further, in an embodiment, the element classifier can also identify a corresponding encryption algorithm for the element (e.g., based on the sensitivity and other factors).

For example, as illustrated in FIG. 5B, the element classifier can use the column name as a factor to determine sensitivity for an element. A column name "User ID" might suggest that the element is not sensitive (e.g., because user ids are public), while a column "Salary" or "Birth Date" might suggest that the element is sensitive (e.g., because this information is not public). Further, the data type (e.g., Short int, float, Char, date, etc.) could be used as a factor along with access frequency, owner, data length, communication method, data source, and database operation. In an embodiment, these factors are used to determine the sensitivity of the element.

Alternatively, or in addition, the factors can be used to determine a suitable encryption technique given the sensitivity. For example, different encryption techniques require different levels of compute resources. Two elements could both be considered highly sensitive, but could have very different access frequencies. The element with a higher access frequency could be associated with a less resource intensive encryption techniques (e.g., to save compute resources because of the frequent access), while an element a lower access frequency could be associated with a more resource intensive encryption technique.

Figure 6A:
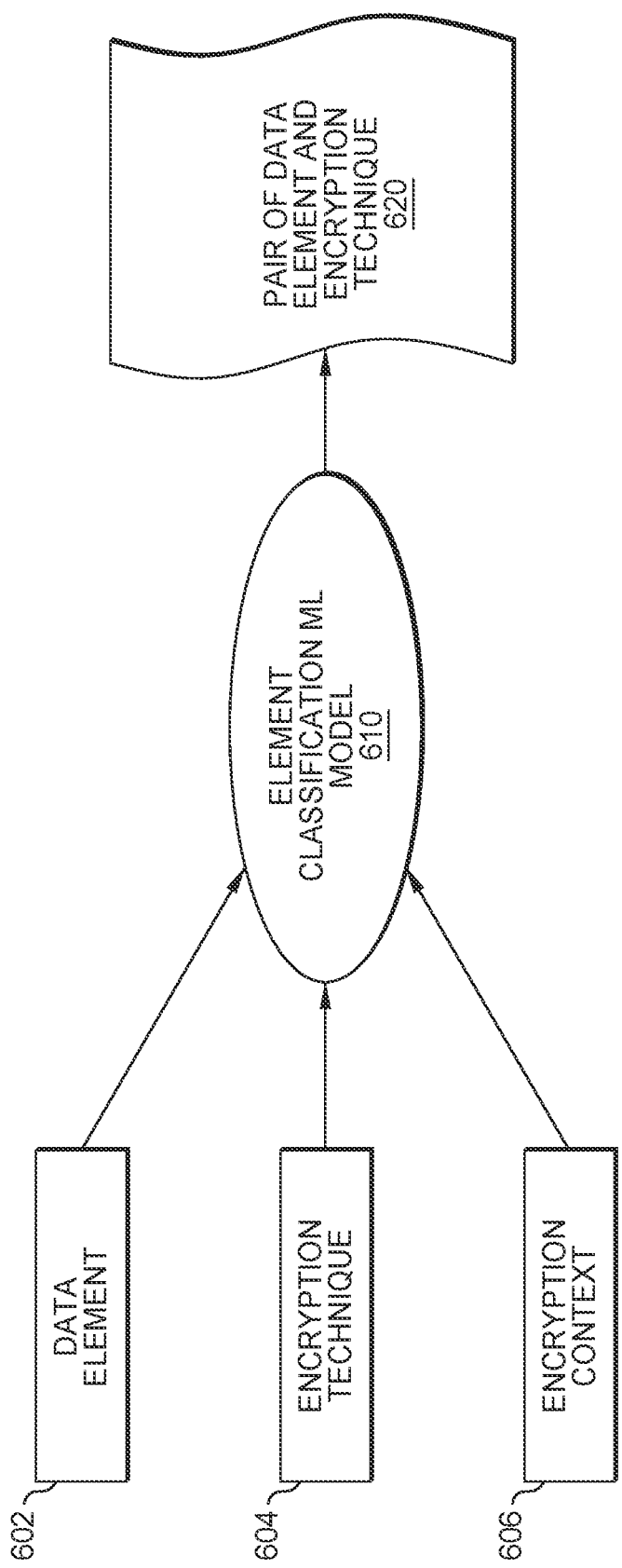
FIG. 6A illustrates training and using a machine learning (ML) model for classifying request elements for hierarchical encryption for data storage, according to one embodiment.

FIG. 6A illustrates training and using an ML model for classifying request elements for hierarchical encryption for data storage, according to one embodiment. A data element 602, encryption technique 604, and encryption context 606 are provided to an element classification ML model 610. In an embodiment, the data element 602 is a parsed element from a request, as discussed above in relation to FIGS. 4-AB. The encryption context 606 can identify contextual information about suitable encryption techniques, including permitted encryption techniques, frequently used encryption techniques, a vendor or provider of encryption techniques, or other suitable information.

In an embodiment, the encryption technique 604 is a listing of supported encryption techniques. Numerous encryption techniques can be used. For example, Advanced Encryption Standard (AES) techniques can be used. AES is commonly used, and is extremely efficient (e.g., not computationally intensive) in its 128-bit form. But AES also uses 192- and 256-bit keys for more demanding encryption purposes. AES is commonly considered effectively invulnerable to all attacks except for brute force, and is become more and more commonly used as a go-to standard for encrypting data.

Triple DES is the successor to the original Data Encryption Standard (DES) algorithm, created in response to identified vulnerabilities in DES. Triple DES is a symmetric encryption that has been very commonly used, but is becoming less common. Triple DES applies the DES algorithm three times to every data block and is commonly used for a variety of purposes, including to encrypt UNIX passwords and ATM PINs.

Blowfish is another encryption technique designed to replace DES. Blowfish is a symmetric tool that breaks messages into 64-bit blocks and encrypts them individually. Blowfish has established a reputation for speed, flexibility, and being effectively unbreakable. Blowfish is commonly found on e-commerce platforms, securing payments, and in password management tools.

Twofish is a symmetric encryption technique that deciphers 128-bit data blocks. Additionally, Twofish encrypts data in 16 rounds, no matter the key size. Twofish is a good fit for many software and hardware environments and is considered one of the fastest, and most efficient, techniques of its type. Many of today's file and folder encryption software solutions use this method.

Rivest-Shamir-Adleman (RSA) is an asymmetric encryption algorithm that works off the factorization of the product of two large prime numbers. Only a user with knowledge of these two numbers can decode the message successfully. Digital signatures commonly use RSA, but the algorithm typically slows down when it encrypts large volumes of data. In an embodiment, the data encryption service can select between AES, triple DES, Blowfish, Twofish, RSA, or any other suitable encryption techniques, for each request element.

In an embodiment, the element classification ML model 610 generates a pairing of a data element and encryption algorithm 620. The element classification ML model can use any suitable ML model, including a decision tree, a deep learning model, a neural network, or any other suitable ML model. In an embodiment the element classification ML model 610 is a supervised ML model, trained using suitable training data reflecting data elements and corresponding encryption techniques. The element classification ML model 610 is discussed further with regard to FIG. 6B.

Figure 6B:
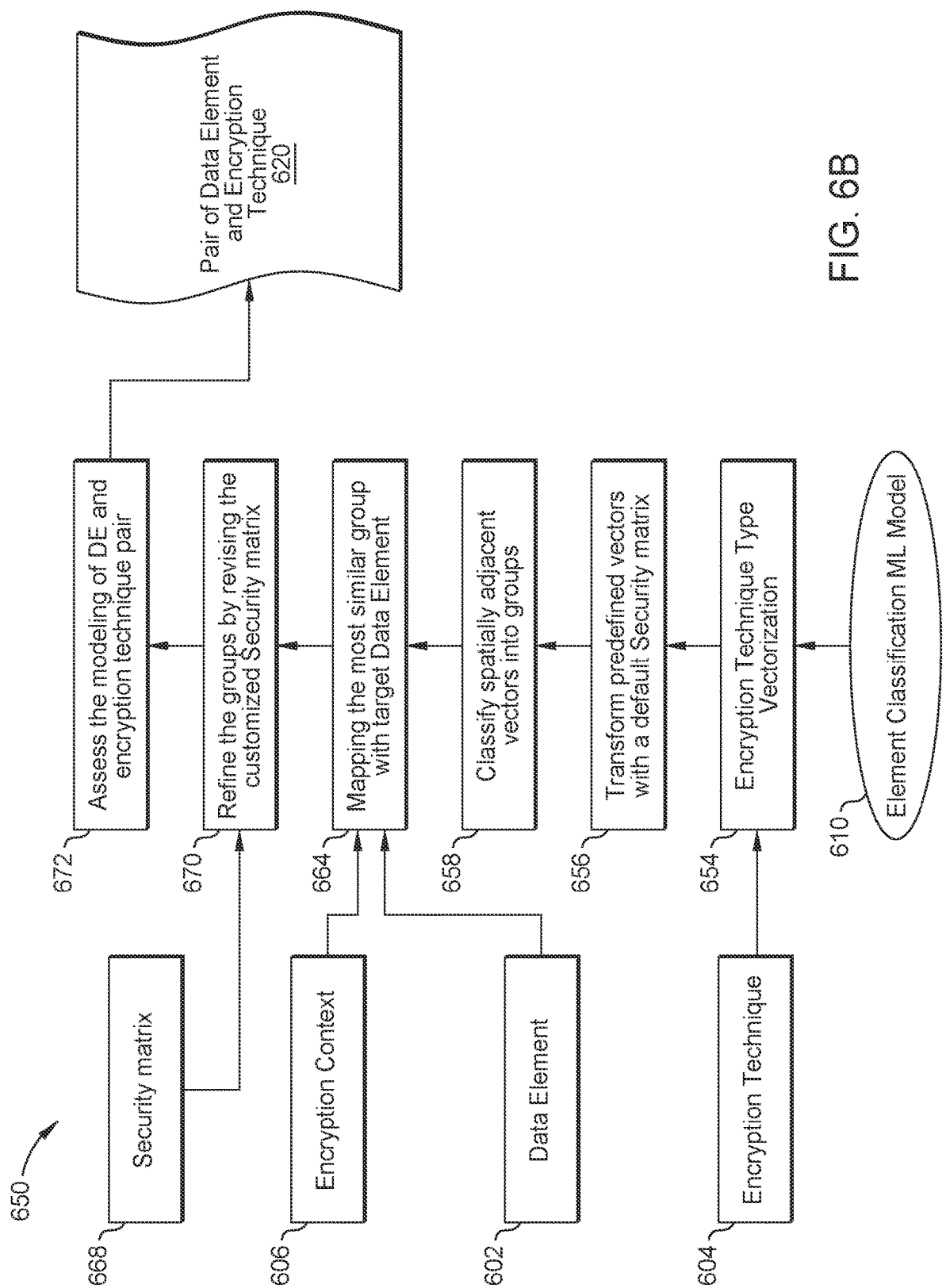
FIG. 6B further illustrates training and using an ML model for classifying request elements for hierarchical encryption for data storage, according to one embodiment.

FIG. 6B further illustrates a flow 650 for training and using an ML model for classifying request elements for hierarchical encryption for data storage, according to one embodiment. In an embodiment, the flow 650 illustrates one technique for using an ML model for classifying request elements. This is merely an example, and any suitable technique can be used.

At block 654, an element classifier (e.g., the element classifier 114 illustrated in FIGS. 1-2) receives one or more encryption techniques 604. The element classifier performs type vectorization on the encryption techniques 604, generating one or more feature vectors describing the algorithms. These feature vectors can be used by an ML model to infer a pairing of a data element and encryption technique 620.

At block 656 the element classifier transforms the vector(s) (e.g., the vector(s) generated at block 654) using a default security matrix (e.g., the security matrix illustrated in FIG. 6C, below). At block 658 the element classifier classifies spatially adjacent vectors into groups. At block 664 the element classifier uses a data element 602 and an encryption context 606 to map a most similar group (e.g., an encryption technique group) with the target data element 602. At block 670 the element classifier refines the groups by revising a customized security matrix 668. At block 672 the element classifier assesses the modeling of the data element (DE) and encryption technique pair, and generates a pairing of a data element and an encryption technique 620.

FIG. 6C illustrates a security matrix 680 for hierarchical encryption for data storage, according to one embodiment. In an embodiment, each column entry is associated with a corresponding security level (e.g., a numeric security level). The security level can be used to identify a suitable encryption technique. For example, a lower security level numeric value (e.g., "1" for the column "Password") can indicate more sensitive data, suitable for a stronger, and more computationally expensive, level of encryption. A higher security level numeric value (e.g., "6" for the column "Hire Data") can indicate less sensitive data, suitable for a weaker, and less computationally expensive, level of encryption, or even no encryption at all.

Figure 7:
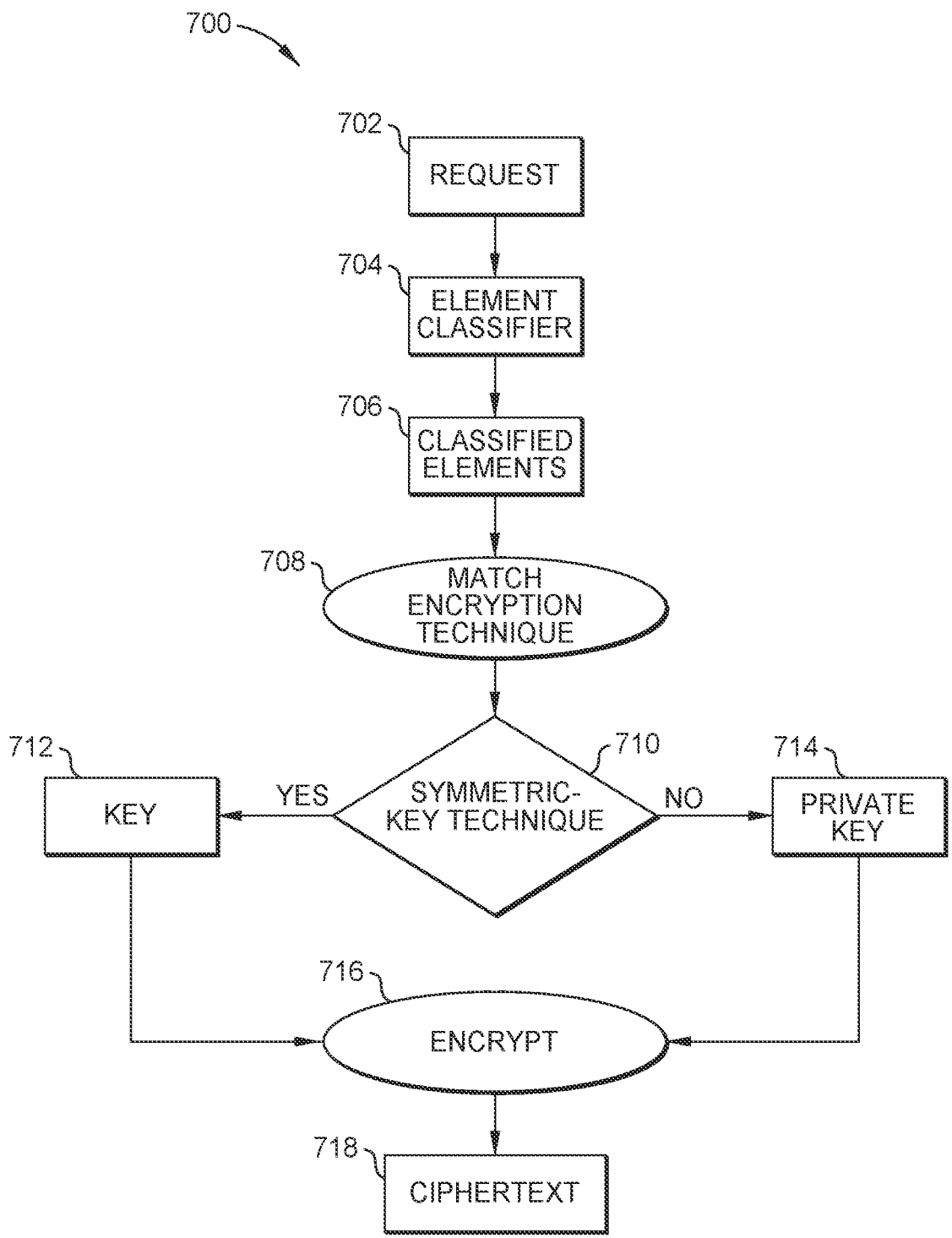
FIG. 7 is a flowchart illustrating encryption for hierarchical encryption for data storage, according to one embodiment.

FIG. 7 is a flowchart 700 illustrating encryption for hierarchical encryption for data storage, according to one embodiment. At block 704 an element classifier (e.g., the element classifier 114 illustrated in FIGS. 1-2) receives a request 702 (e.g., a DML storage request). In an embodiment, the element classifier provides classified elements 706 to a data encryption service (e.g., the data encryption service 122 illustrated in FIGS. 1-2).

At block 708, the data encryption service matches classified elements to encryption techniques (e.g., as discussed above in relation to FIGS. 6A-C). Further, in an embodiment, the data encryption service stores the encryption technique corresponding to each element in a security catalog. The security catalog can be any suitable repository, including a database table, a remote storage location, or any other suitable repository. In an embodiment, the security catalog can be used during decryption to identify the encryption technique corresponding to each element. This is discussed further below with regard to block 808 in FIG. 8.

At block 710, the data encryption service determines whether the identified encryption technique is a symmetric key technique. If yes, the flow proceeds to block 712. At block 712, the data encryption service identifies an encryption key (e.g., a symmetric encryption key). If no, the flow proceeds to block 714. At block 714, the data encryption service identifies a private encryption key. In both scenarios, the flow proceeds to block 716.

At block 716, the data encryption service encrypts the data. For example, the data encryption service can use the key generated at block 712 or 714, and the encryption technique identified at block 708, to encrypt data identified at 702 and generate cipher text. At block 718, the data encryption service stores the cipher text (e.g., according to the request 702).

Figure 8:
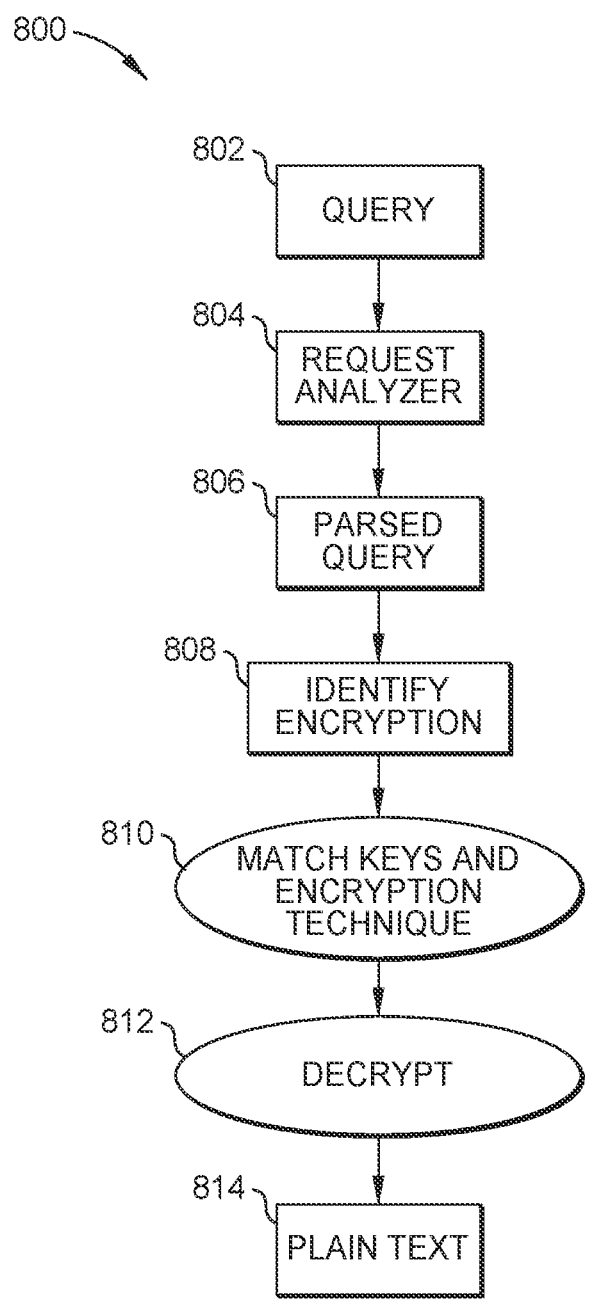
FIG. 8 is a flowchart illustrating decryption for hierarchical encryption for data storage, according to one embodiment.

FIG. 8 is a flowchart 800 illustrating decryption for hierarchical encryption for data storage, according to one embodiment. At block 804, a request analyzer (e.g., the request analyzer 112 illustrated in FIGS. 1-2) receives a query 802 (e.g., a DML query to retrieve previously encrypted data). The request analyzer generates a parsed query 806 (e.g., as discussed above in relation to FIGS. 4A-B).

At block 808 a data decryption service (e.g., the data decryption service 124 illustrated in FIGS. 1-2) identifies encryption techniques for the parsed query. For example, as discussed above in relation to block 708 in FIG. 7, during encryption the technique corresponding to each element can be stored in a security catalog. The data decryption service can use this security catalog to identify the encryption technique corresponding to each element. For example, the security catalog can be a database table, and the data decryption service can retrieve the encryption technique for each element from the database table.

At block 810, the data decryption service matches keys and encryption technique. For example, the data decryption service can identify the encryption key to use for decrypting the stored data for the element. The key can be a public key, a symmetric key, or any other suitable encryption key. At block 812, the data decryption service decrypts the data (e.g., the data identified in the query 802) and generates plain text 814.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
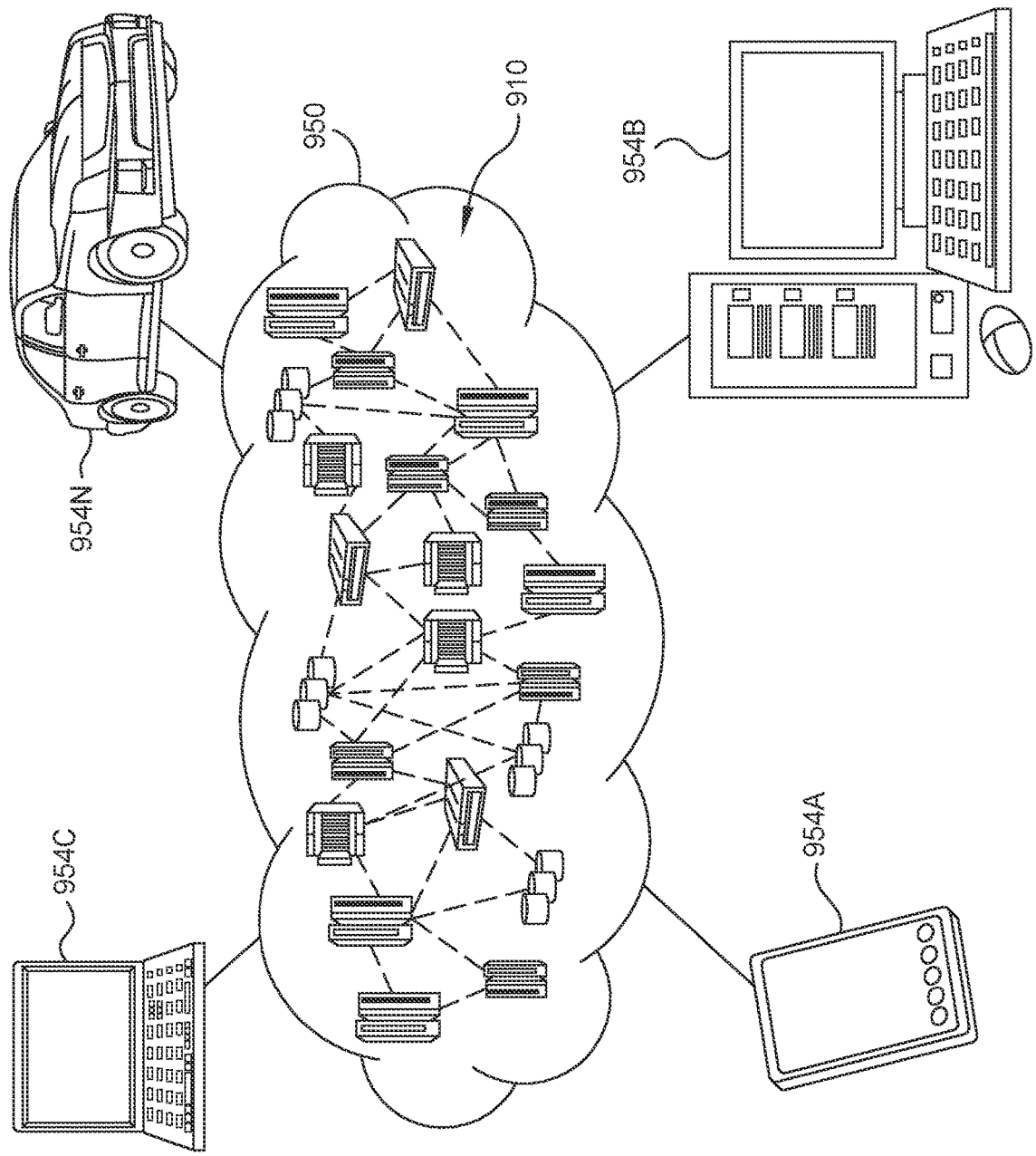
FIG. 9 depicts a cloud computing environment, according to one embodiment.

Referring now to FIG. 9, illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
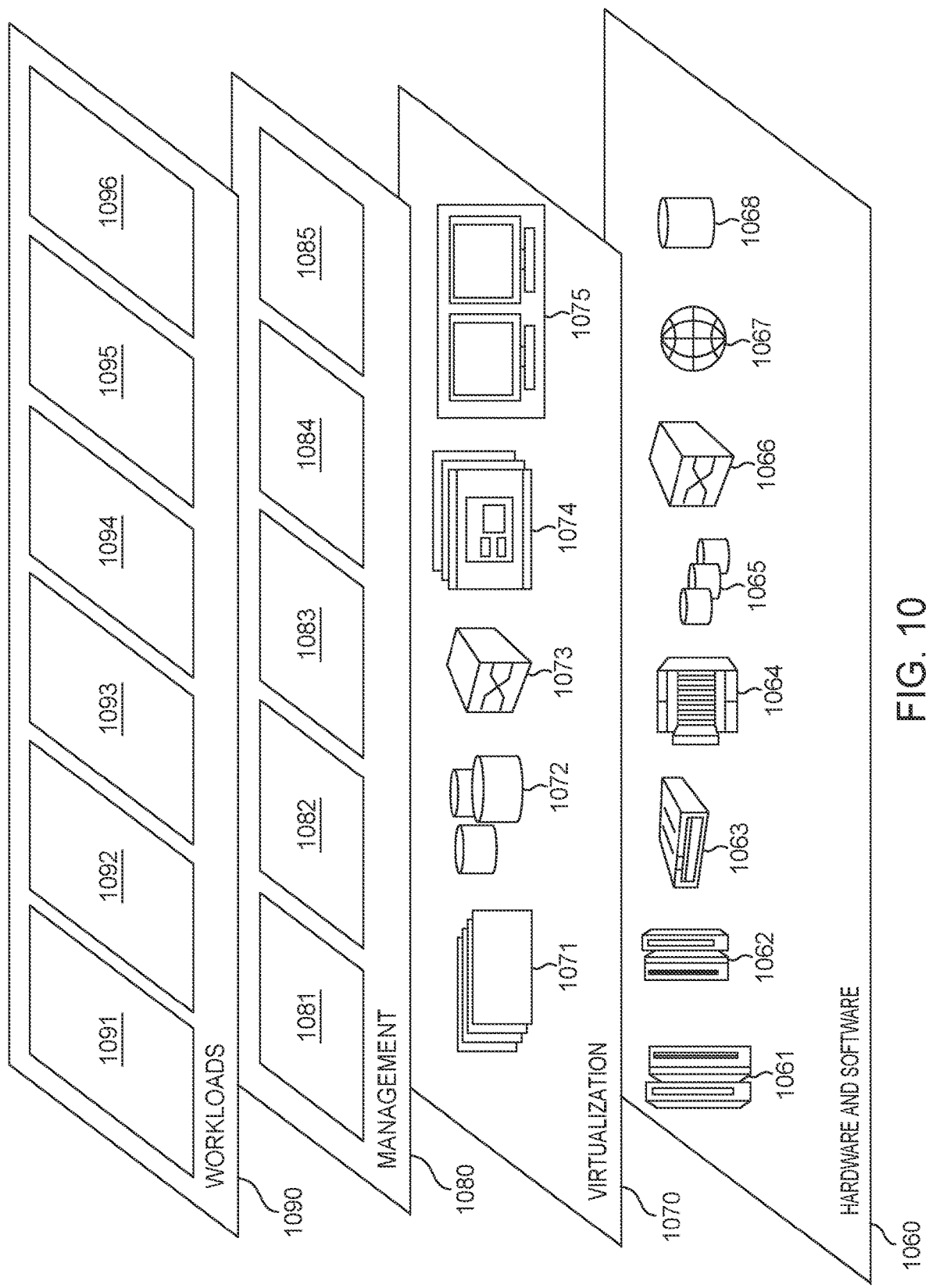
FIG. 10 depicts abstraction model layers, according to one embodiment.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067 and database software 1068.

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Examples of workloads and functions which may be provided from this layer include: mapping and navigation 1091; software development and lifecycle management 1092; virtual classroom education delivery 1093; data analytics processing 1094; transaction processing 1095; and hierarchical encryption 1096 (e.g., implementing one or more aspects of the hierarchical encryption controller 110 illustrated in FIG. 2, including any, or all, of the request analyzer 112, the element classifier 114, the data encryption service 122, and the data decryption service 124).

While the foregoing is directed to embodiments of the present invention, other and further embodiments of the invention may be devised without departing from the basic scope thereof, and the scope thereof is determined by the claims that follow.

While the foregoing is directed to embodiments of the present invention, other and further embodiments of the invention may be devised without departing from the basic scope thereof, and the scope thereof is determined by the claims that follow.

What is claimed is:

1. A method comprising:
   parsing an electronic database storage request, based on a syntax of the request, to identify a plurality of request elements;
   determining, using one or more trained machine learning (ML) models, one or more sensitivities associated with the plurality of request elements;
   identifying one or more encryption techniques for the plurality of request elements based on the one or more sensitivities, comprising:
      determining one or more encryption technique groups of a plurality of available encryption techniques, wherein each encryption technique group comprises one or more available encryption techniques with spatially adjacent feature vectors,
      generating a pairing for each request element, of the plurality of request elements, by mapping each request element to a corresponding encryption technique group based on encryption context data, and
      selecting the one or more encryption techniques for the plurality of request elements from the generated pairings;
   encrypting data associated with the database storage request using the identified one or more encryption techniques; and
   storing the encrypted data and one or more associated encryption keys in an electronic database, using the electronic database storage request.

2. The method of claim 1, wherein identifying the one or more encryption techniques comprises identifying a plurality of different encryption techniques based on identifying a plurality of different sensitivities corresponding to the plurality of request elements using the one or more trained ML models.

3. The method of claim 1, further comprising:
   selecting an ML model, from among a plurality of different ML models, for each request element based on a characteristic of the request element; and
   determining a sensitivity corresponding to each request element based on analyzing the request element using a respective selected ML model.

4. The method of claim 3, further comprising:
   identifying a plurality of different encryption techniques for the data storage request based on the determined sensitivity corresponding to each request element, wherein encrypting the data uses the identified plurality of different encryption techniques.

5. The method of claim 1, wherein identifying the one or more encryption techniques for the plurality of request elements based on the one or more sensitivities further comprises:
   refining each generated pairing using a security matrix, wherein the security matrix associates each request element, of the plurality of request elements, with a corresponding security level, comprising:
      for a respective pairing that comprises a respective request element and one or more available encryption techniques, filtering the one or more available encryption techniques based on a security level associated with the request element.

6. The method of claim 1, wherein the electronic database storage request comprises a data manipulation language (DML) statement, and wherein parsing the electronic database storage request comprises:
   constructing a syntax tree from the electronic database storage request; and
   identifying the plurality of request elements using the syntax tree.

7. The method of claim 1, wherein identifying the one or more encryption techniques comprises:
   determining the one or more encryption techniques based on analyzing the determined one or more sensitivities using a second one or more ML models.

8. The method of claim 1, wherein identifying the one or more encryption techniques comprises:
- determining the one or more encryption techniques based on looking up the determined one or more sensitivities in a lookup table.

9. The method of claim 1, further comprising:
- parsing an electronic database query to identify a plurality of query elements;
- determining one or more decryption techniques associated with the plurality of query elements;
- retrieving data from an electronic database using the electronic database query; and
- decrypting the data using the determined one or more decryption techniques.

10. The method of claim 9, wherein determining the one or more decryption techniques associated with the plurality of query elements comprises:
- retrieving the one or more decryption techniques from an electronic catalog.

11. A system, comprising:
- a memory; and
- a processor communicatively coupled to the memory, the processor configured to perform operations comprising:
  - parsing an electronic database storage request, based on a syntax of the request, to identify a plurality of request elements;
  - determining, using one or more trained machine learning (ML) models, one or more sensitivities associated with the plurality of request elements;
  - identifying one or more encryption techniques for the plurality of request elements based on the one or more sensitivities, comprising:
    - determining one or more encryption technique groups of a plurality of available encryption techniques, wherein each encryption technique group comprises one or more available encryption techniques with spatially adjacent feature vectors,
    - generating a pairing for each request element, of the plurality of request elements, by mapping each request element to a corresponding encryption technique group based on encryption context data, and
    - selecting the one or more encryption techniques for the plurality of request elements from the generated pairings;
  - encrypting data associated with the database storage request using the identified one or more encryption techniques; and
  - storing the encrypted data and one or more associated encryption keys in an electronic database, using the electronic database storage request.

12. The system of claim 11, wherein identifying the one or more encryption techniques comprises identifying a plurality of different encryption techniques based on identifying a plurality of different sensitivities corresponding to the plurality of request elements using the one or more trained ML models.

13. The system of claim 11, the operations further comprising:
- selecting an ML model, from among a plurality of different ML models, for each request element based on a characteristic of the request element; and
- determining a sensitivity corresponding to each request element based on analyzing the request element using a respective selected ML model.

14. The system of claim 13, the operations further comprising:
- identifying a plurality of different encryption techniques for the data storage request based on the determined sensitivity corresponding to each request element, wherein encrypting the data uses the identified plurality of different encryption techniques.

15. The system of claim 11, wherein identifying the one or more encryption techniques for the plurality of request elements based on the one or more sensitivities further comprises:
- refining each generated pairing using a security matrix, wherein the security matrix associates each request element, of the plurality of request elements, with a corresponding security level, comprising:
  - for a respective pairing that comprises a respective request element and one or more available encryption techniques, filtering the one or more available encryption techniques based on a security level associated with the request element.

16. A computer program product, comprising:
- a computer-readable storage medium having computer-readable program code embodied therewith, the computer-readable program code executable by one or more computer processors to perform operations comprising:
  - parsing an electronic database storage request, based on a syntax of the request, to identify a plurality of request elements;
  - determining, using one or more trained machine learning (ML) models, one or more sensitivities associated with the plurality of request elements;
  - identifying one or more encryption techniques for the plurality of request elements based on the one or more sensitivities, comprising:
    - determining one or more encryption technique groups of a plurality of available encryption techniques, wherein each encryption technique group comprises one or more available encryption techniques with spatially adjacent feature vectors,
    - generating a pairing for each request element, of the plurality of request elements, by mapping each request element to a corresponding encryption technique group based on encryption context data, and
    - selecting the one or more encryption techniques for the plurality of request elements from the generated pairings;
  - encrypting data associated with the database storage request using the identified one or more encryption techniques; and
  - storing the encrypted data and one or more associated encryption keys in an electronic database, using the electronic database storage request.

17. The computer program product of claim 16, wherein identifying the one or more encryption techniques comprises identifying a plurality of different encryption techniques based on identifying a plurality of different sensitivities corresponding to the plurality of request elements using the one or more trained ML models.

18. The computer program product of claim 16, the operations further comprising:
- selecting an ML model, from among a plurality of different ML models, for each request element based on a characteristic of the request element; and determining a sensitivity corresponding to each request element based on analyzing the request element using a respective selected ML model.

19. The computer program product of claim 18, the operations further comprising:
identifying a plurality of different encryption techniques for the data storage request based on the determined sensitivity corresponding to each request element, wherein encrypting the data uses the identified plurality of different encryption techniques.

20. The computer program product of claim 16, wherein identifying the one or more encryption techniques for the plurality of request elements based on the one or more sensitivities further comprises:
refining each generated pairing using a security matrix, wherein the security matrix associates each request element, of the plurality of request elements, with a corresponding security level, comprising:
for a respective pairing that comprises a respective request element and one or more available encryption techniques, filtering the one or more available encryption techniques based on a security level associated with the request element.

\* \* \* \* \*